July 25, 1967 S. MICHETTI 3,332,690

CONNECTABLE CONCENTRIC RECORD DISCS

Filed Feb. 5, 1965

INVENTOR.
SANTE MICHETTI
BY
Charles Richard Werner
ATTORNEY

United States Patent Office 3,332,690

Patented July 25, 1967

3,332,690
CONNECTABLE CONCENTRIC RECORD DISCS

Sante Michetti, Via dell'Orso 9, Milan, Italy

Filed Feb. 5, 1965, Ser. No. 430,604
6 Claims. (Cl. 274—42)

This invention relates in general to records for record players and in particular to a record composed of a plurality of concentric planar discs of different diameters interconnectable to form a unitary structure.

The development of microgroove and long play records has made available many recordings on one disc but at the same time the overall price of such records has increased.

It has been proven by statistics and sales records that teenagers form the greater part of the record buying public. However, as a group, teenagers are limited financially in the purchase of high priced records.

By use of my invention it is possible for a buyer of records to obtain a complete record by purchasing a disc at a time and thereby eventually have all the discs necessary to make up a full size record which will be formed of a plurality of interconnectable discs with one or more tunes on each disc.

The primary object of the invention is to provide a complete record formed of connectable concentric discs, each having one or more tunes thereon, whereby discs may be purchased as individual units and assembled from time to time to eventually form a complete full size multi-tune record.

It is another object of my invention to provide a suitable engaging construction on the peripheries of the discs whereby adjacent discs may be locked together in secure but removable relation.

One more object of my invention is to provide registration means whereby the proper relationship between the adjacent discs will be established so that the tone arm cartridge needle will move properly from one disc to the next as a recording is completed.

Still another object of my invention is to provide by use of my idea the possibility that purchasers can make up their own sequence of recordings by purchasing the desired recordings in any one of the different concentric disc positions and to thereafter rearrange at will the record sequences by changing the positions and relationships of different discs.

Other objects and advantages as well as the construction and manner of use of my invention will be apparent by reference to the following description in connection with the accompanying drawing in which.

Figures 1, 2:
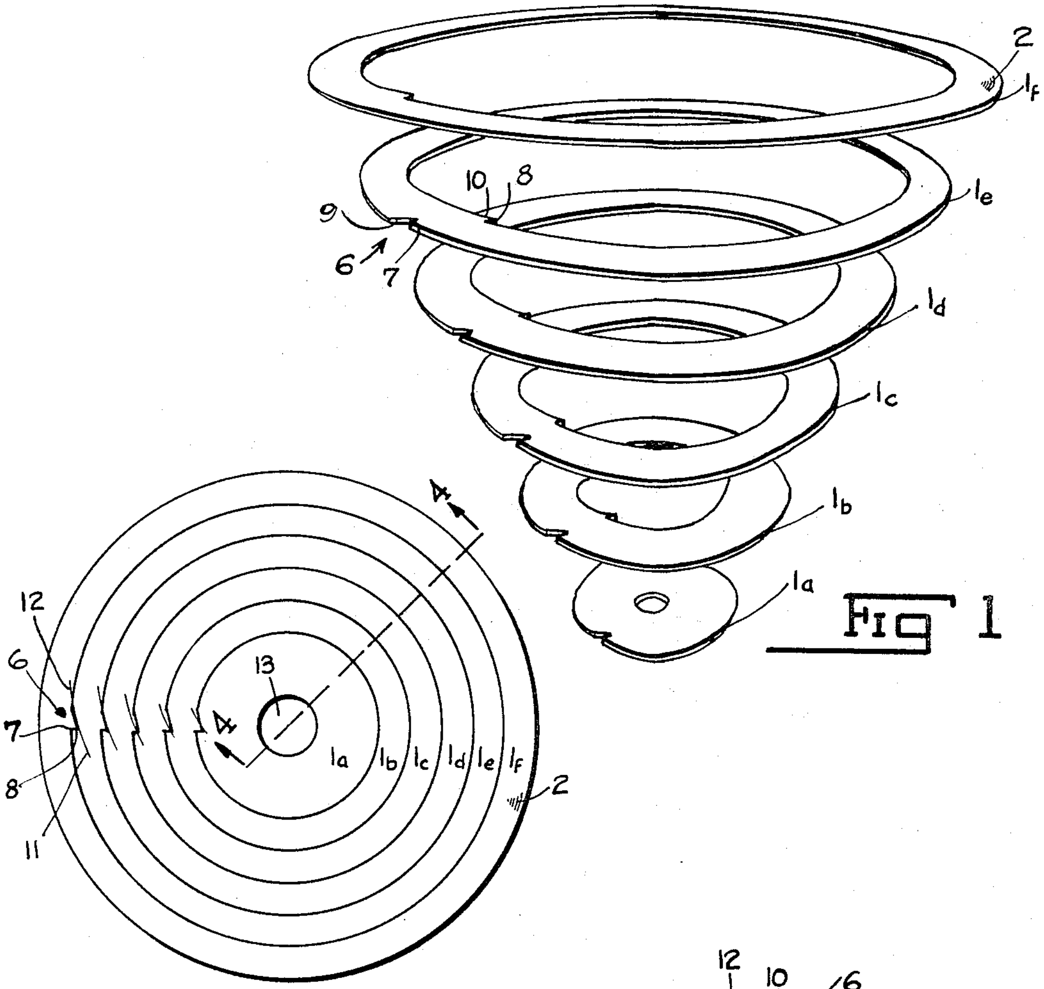
FIG. 1 is an exploded view of a plurality of concentric annular discs adapted to interengage one with its adjacent discs to make up a plural-disc record.
FIG. 2 is a plan view of the same.
Figure 3:
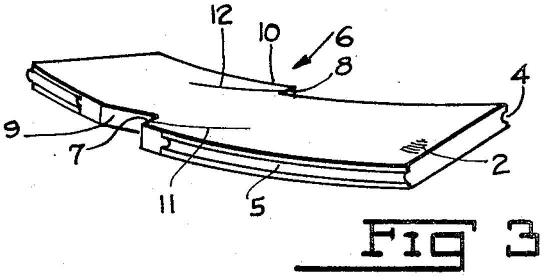
FIG. 3 is an enlarged, perspective, fragmentary view showing details of the locking and registration means.
Figure 4:
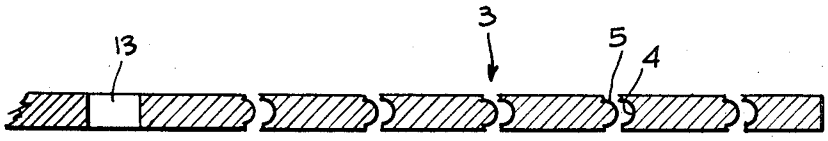
FIG. 4 is an enlarged cross-sectional and exploded view on the line 4—4 of FIG. 2 showing one form of locking means between the discs.

Referring now to the drawing by numeral of reference in the exploded view of FIG. 1, each disc $1_a$ to $1_f$ is provided with at least one set of recording grooves 2 on one or both sides thereof, the discs being further provided with disc locking means 3, one form of which may employ annular internal grooves 4 and annular external ribs

5 providing for pressure engagement and disengagement in assembly and disassembly of the desired discs. Any other suitable form of engaging means may be used and I do not wish to be limited to that shown.

In order to provide the proper peripheral relationship between adjacent records so the needle will be directed to the next record when the preceding one is completed, registration means 6 are provided which comprise abutting shoulders 7 and 8, angular faces 9 and 10, and aligning needle guide grooves 11 and 12 for directing the needle from one record to the next. The inner disc $1_a$ may be provided with an aperture 13 of suitable size for the turntable spindle.

When a recording is made for use with my invention it may be made on all the discs at one time and a buyer may purchase the recording in any one of the desired positions. Normally one would start with the inner disc $1_a$ and purchase other discs in consecutively larger sizes. After a number of various size discs are in one's record collection, different groups of discs can be selected and made up into a composite disc with different arrangements of recordings.

Among teenagers, records or parts of complete records can be swapped or loaned for special occasions. Where background music is needed for a style show or for any other special event, the individual discs can be obtained and assembled for precisely the sequence needed, making it unnecessary to change records quickly and accurately as is the situation at present. In radio station work, for instance, when a program is planned with certain musical background or special recorded announcements, these can be made in advance on precisely the correct annular disc and then preassembled for playing consecutively without any danger of playing the wrong recording.

The form of grooves 4 and ribs 5, and the material from which the records are formed, are such that the adjacent record or discs are engaged or disengaged by pressure into or out of planar relationship, being careful to see that the shoulders 7 and 8 are properly positioned for registration.

From the foregoing it will be seen that I have devised a new and novel construction for the recording industry which will make a revolutionary change in sales and use of records, making it possible to assemble any desired sequence of songs or recordings to fit the occasion, and to change this sequence at will. It will also make it possible to purchase any number of record segments or discs as limited by financial condition of the purchaser so that by periodic purchases a complete, full record can be assembled.

Obviously slight changes in form, proportion and details of construction may be resorted to without departing from the spirit of my invention and I reserve all right to such changes as fall within the scope of these specifications and the claims which follow.

What I claim as new and desire to secure by Letters Patent is:

1. A record comprising a plurality of individual concentric discs each having at least one recording thereon, each disc being consecutively larger than its adjacent smaller disc, the annular edges of the adjacent discs engaging each other in gripping but removable relation.

2. The structure as specified in claim 1, including registering means between the adjacent discs for precise positioning of one disc in relation to the other.

3. The structure as specified in claim 1, including locking means between adjacent discs preventing turning of one disc in relation with adjacent discs when interengaged.

4. The structure as specified in claim 1, including aligned needle guide means on adjacent discs.

5. The structure as specified in claim 2, said registering means comprising an angular projection on each adjacent disc, the position of said angular projections being predetermined to locate a point on the peripheral edge of one disc in exact relation to a point on the peripheral edge of its adjoining disc.

6. The structure as specified in claim 1, each disc having an inner and outer periphery and including annular grooved means on one periphery of each disc engageable in removable relation with annular rib means on the other periphery of the adjacent disc.

No references cited.

LEONARD FORMAN, *Primary Examiner.*

F. J. D'AMEROSIO, *Assistant Examiner.*